(12) United States Patent
Kemler et al.

(10) Patent No.: US 12,179,740 B2
(45) Date of Patent: Dec. 31, 2024

(54) METHOD AND CONTROL UNIT FOR OPERATING A HYBRID VEHICLE

(71) Applicant: ZF Friedrichshafen AG, Friedrichshafen (DE)

(72) Inventors: Johannes Kemler, Lindau (DE); Frank Deprez, Mariabrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 359 days.

(21) Appl. No.: 17/527,696

(22) Filed: Nov. 16, 2021

(65) Prior Publication Data

US 2022/0153256 A1    May 19, 2022

(30) Foreign Application Priority Data

Nov. 17, 2020   (DE) ...................... 10 2020 214 385.4

(51) Int. Cl.
| | |
|---|---|
| *B60W 10/11* | (2012.01) |
| *B60W 10/02* | (2006.01) |
| *B60W 20/30* | (2016.01) |
| *B60W 30/19* | (2012.01) |

(52) U.S. Cl.
CPC ............ *B60W 20/30* (2013.01); *B60W 10/02* (2013.01); *B60W 10/11* (2013.01); *B60W 30/19* (2013.01);
(Continued)

(58) Field of Classification Search
CPC ................. B60W 20/40; B60W 30/19; B60W 2510/1005; B60W 2510/081;
(Continued)

(56) References Cited

U.S. PATENT DOCUMENTS

| | | | |
|---|---|---|---|
| 8,793,045 B2 * | 7/2014 | Ueda ...................... | B60W 10/06 180/65.265 |
| 9,227,629 B2 | 1/2016 | Zollner et al. | |

(Continued)

FOREIGN PATENT DOCUMENTS

| | | |
|---|---|---|
| DE | 102011078670 A1 | 1/2013 |
| DE | 102013225547 A1 | 6/2015 |

(Continued)

OTHER PUBLICATIONS

English translation of DE102013225547A1; http://translationportal.epo.org; Apr. 2, 2024 (Year: 2024).*

(Continued)

*Primary Examiner* — Roger L Pang
(74) *Attorney, Agent, or Firm* — Dority & Manning, P.A.

(57) ABSTRACT

A method for operating a hybrid vehicle includes, depending on a presence of a control-side demand to engage a separating clutch (4), implementing an engagement process of the separating clutch (4) during driving under purely electric motor power and, depending on the presence of a control-side demand to implement an upshift in a transmission (5), implementing a gear ratio change from a current gear of the upshift into a target gear of the upshift. In response to the control-side demand to engage the separating clutch (4) and the control-side demand to implement the upshift, the method includes checking whether the upshift is necessary in order to prevent a vehicle-side rotational speed from reaching or exceeding a rotational speed limit value. When the upshift is necessary in order to prevent the vehicle-side rotational speed from reaching or exceeding the rotational speed limit value, the implementation of the upshift in the transmission is prioritized over the implementation of the engagement process of the separating clutch.

10 Claims, 3 Drawing Sheets

(52) U.S. Cl.
CPC ............... *B60W 2510/0638* (2013.01); *B60W 2510/1015* (2013.01); *B60W 2510/104* (2013.01); *B60W 2520/10* (2013.01); *B60W 2710/021* (2013.01)

(58) Field of Classification Search
CPC ........... B60W 20/30; B60W 2510/104; B60W 2520/10; B60W 10/11; B60W 2510/1015; B60W 2710/021; B60W 2710/1005; B60W 10/02
USPC .................................... 477/5; 701/53, 51, 66
See application file for complete search history.

(56) References Cited

U.S. PATENT DOCUMENTS 10,300,908 B2 * 5/2019 Ishida .................... B60K 6/547
2013/0296117 A1 * 11/2013 Shelton ................. B60W 30/19
  477/3
2014/0343771 A1 * 11/2014 Kim ..................... B60W 10/10
  180/65.265
2021/0253084 A1 * 8/2021 Kwon ..................... B60K 6/48
2021/0387612 A1 * 12/2021 Park ....................... B60W 20/30

FOREIGN PATENT DOCUMENTS

DE         102019203245 A1 * 9/2020
WO    WO 2013/004464         1/2013

OTHER PUBLICATIONS

English translation of DE102019203245A1; http://translationportal.epo.org; Apr. 2, 2024 (Year: 2024).*
German Search Report DE 10 2020 214 385.4, dated Jul. 19, 2021. (12 pages).

* cited by examiner

METHOD AND CONTROL UNIT FOR OPERATING A HYBRID VEHICLE

CROSS-REFERENCE TO RELATED APPLICATION

The present application is related and has right of priority to German Patent Application No. 102020214385.4 filed in the German Patent Office on Nov. 17, 2020, which is incorporated by reference in its entirety for all purposes.

FIELD OF THE INVENTION

The invention relates generally to a method for operating a hybrid vehicle. Moreover, the invention relates generally to a control unit for operating a hybrid vehicle.

BACKGROUND

Hybrid vehicles known from practical experience include an internal combustion engine and an electric machine as prime movers. A separating clutch is connected between the internal combustion engine and the electric machine. Moreover, hybrid vehicles include a transmission, which converts rotational speeds and torques, and, in this way, provides an available tractive force of the prime movers at a driven end of the hybrid vehicle. The transmission is connected between the electric machine and the driven end.

A hybrid vehicle can be operated in different operating modes. For example, a hybrid vehicle can be operated under purely electric motor power while the internal combustion engine is, in particular, shut off and decoupled from the driven end. For this purpose, the separating clutch connected between the internal combustion engine and the electric machine is disengaged. Moreover, a hybrid vehicle can be operated in a hybrid manner, wherein, in this case, the internal combustion engine is re-started and, with the separating clutch engaged, coupled to the driven end.

A transmission includes multiple shift elements. In every engaged gear of the transmission, a first number of shift elements is engaged and a second number of shift elements is disengaged. If a gear shift or a gear ratio change from a current gear into a target gear is implemented in the transmission, at least one shift element engaged in the current gear is disengaged and at least one shift element disengaged in the current gear is engaged.

The implementation of a gear shift as well as the implementation of an engagement process of the separating clutch for coupling the internal combustion engine and for changing from a purely electric operation into a hybrid operation of the hybrid vehicle are demanded on the control side. Depending thereon, the gear shift in the transmission and the engagement process of the separating clutch are triggered and implemented.

Previously, it has been proven difficult to optimally coordinate the implementation of a demanded upshift and the implementation of a demanded engagement process of the separating clutch with each other.

DE 10 2011 078 670 A1 discloses a method for operating a hybrid vehicle and, in fact, sequences for coordinating an upshift with a drag start or a re-starting of the internal combustion engine, for which the separating clutch connected between the internal combustion engine and the electric machine must be engaged. If the separating clutch is to be engaged during an upshift in progress, then, according to this prior art, a shift blocking instruction is transmitted, which checks whether the upshift in progress can be aborted. If this is the case, the upshift is aborted and the drag start or the re-starting of the internal combustion engine is carried out and, for this purpose, the separating clutch is engaged. The upshift is carried out only for the case in which the upshift in progress can no longer be aborted, wherein the re-starting or the drag start of the internal combustion engine then takes place at the end of the gear shift. According to the prior art, an engagement process of the separating clutch is prioritized over the implementation of an upshift.

For the case in which the engagement of the separating clutch is prioritized over the implementation of an upshift, a shift request, i.e., the demand for a gear shift, is ignored. An upshift is therefore delayed accordingly. This can be problematic when an unimplemented upshift results in a vehicle-side rotational speed, in particular a prime mover-side rotational speed, reaching or exceeding a rotational speed limit value. Therefore, neither the rotational speed of the electric machine nor the rotational speed of the internal combustion engine is permitted to exceed a rotational speed limit value. If this is the case, the rotational speed must be governed. This is disadvantageous.

SUMMARY OF THE INVENTION

Example aspects of the present invention provide a method and a control unit, with the aid of which the aforementioned problems can be avoided.

According to example aspects of the present subject matter, a method for operating a hybrid vehicle includes, in the presence of a control-side demand to engage the separating clutch and in the presence of a control-side demand to implement an upshift, checking whether the demanded upshift is necessary in order to prevent a vehicle-side rotational speed from reaching or exceeding a rotational speed limit value. For the case in which the demanded upshift is necessary in order to prevent the vehicle-side rotational speed from reaching or exceeding the rotational speed limit value, the implementation of the upshift in the transmission is prioritized over the implementation of the engagement process of the separating clutch.

According to example aspects of the present invention, it is therefore checked whether a demanded upshift is absolutely necessary in order to prevent a vehicle-side rotational speed, in particular a prime mover-side rotational speed, from reaching or exceeding a rotational speed limit value. For the case in which the demanded upshift is necessary in order to avoid such an overspeed, the implementation of the upshift in the transmission is prioritized over the implementation of the engagement process of the separating clutch. As a result, a vehicle-side rotational speed can be prevented from reaching or exceeding an appropriate rotational speed limit value. In particular, the situation can be avoided, in which a prime mover-side rotational speed must be governed via a governing process.

According to one example refinement, for the case in which the demanded engagement process of the separating clutch has already been implemented and then a control-side demand for an upshift is present, it is checked whether a difference between a synchronous speed of the current gear of the demanded upshift and a current rotational speed of the internal combustion engine is greater than or less than a limit value. For the case in which the difference between the synchronous speed of the current gear and the current rotational speed of the internal combustion engine is greater than the limit value, the on-going engagement process of the separating clutch is aborted and then the upshift is triggered and implemented in the transmission. After the implementation of the upshift in the transmission, the engagement process of the separating clutch is triggered and implemented.

This example refinement is preferred in order to prioritize the implementation of the upshift over the implementation of the engagement process of the separating clutch for the case in which an engagement process of the separating clutch has already been implemented and, during the ongoing engagement process of the separating clutch, an upshift is demanded on the control side, which is necessary in order to avoid a vehicle-side overspeed.

If the difference between the synchronous speed of the current gear of the demanded upshift and the current rotational speed of the internal combustion engine is greater than the limit value, the engagement process of the separating clutch and, thereby, the implementation of the engagement process of the separating clutch is aborted and the upshift is immediately triggered and implemented.

However, if the difference between the synchronous speed of the current gear of the demanded upshift and the current rotational speed of the internal combustion engine is less than the limit value, the engagement process of the separating clutch is continued and, in parallel thereto or simultaneously therewith, the upshift is triggered and implemented in the transmission, for the purpose of which parameters of the engagement process of the separating clutch are preferably adapted in order to accelerate the engagement process.

According to one further example refinement, for the case in which an engagement process of the separating clutch is demanded, a trigger point is ascertained, at which a demanded upshift must be triggered at the latest in order to prevent the vehicle-side rotational speed from reaching or exceeding the rotational speed limit value. As the first period of time, a period of time between the demand for the engagement process of the separating clutch and the ascertained trigger point of the upshift is ascertained. It is checked whether this first period of time is shorter than a second period of time, which is required in order to engage the separating clutch to such an extent that the upshift can be triggered. For the case in which the first period of time is shorter than the second period of time, the upshift is immediately triggered and implemented and the engagement process of the separating clutch is implemented into the target gear of the upshift.

This example refinement of the invention is preferred in order to check, before the triggering and implementation of a demanded engagement process of the separating clutch, whether a demanded upshift, which is necessary in order to avoid an overspeed, should be immediately triggered and implemented. As a result thereof as well, the implementation of the upshift is prioritized over the implementation of the engagement process of the separating clutch. The demanded upshift that is necessary in order to avoid an overspeed is triggered and implemented at first, then the engagement process of the separating clutch is implemented into the target gear of the upshift.

BRIEF DESCRIPTION OF THE DRAWINGS

Exemplary embodiments of the invention are explained in greater detail with reference to the drawings, without being limited thereto, in which.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
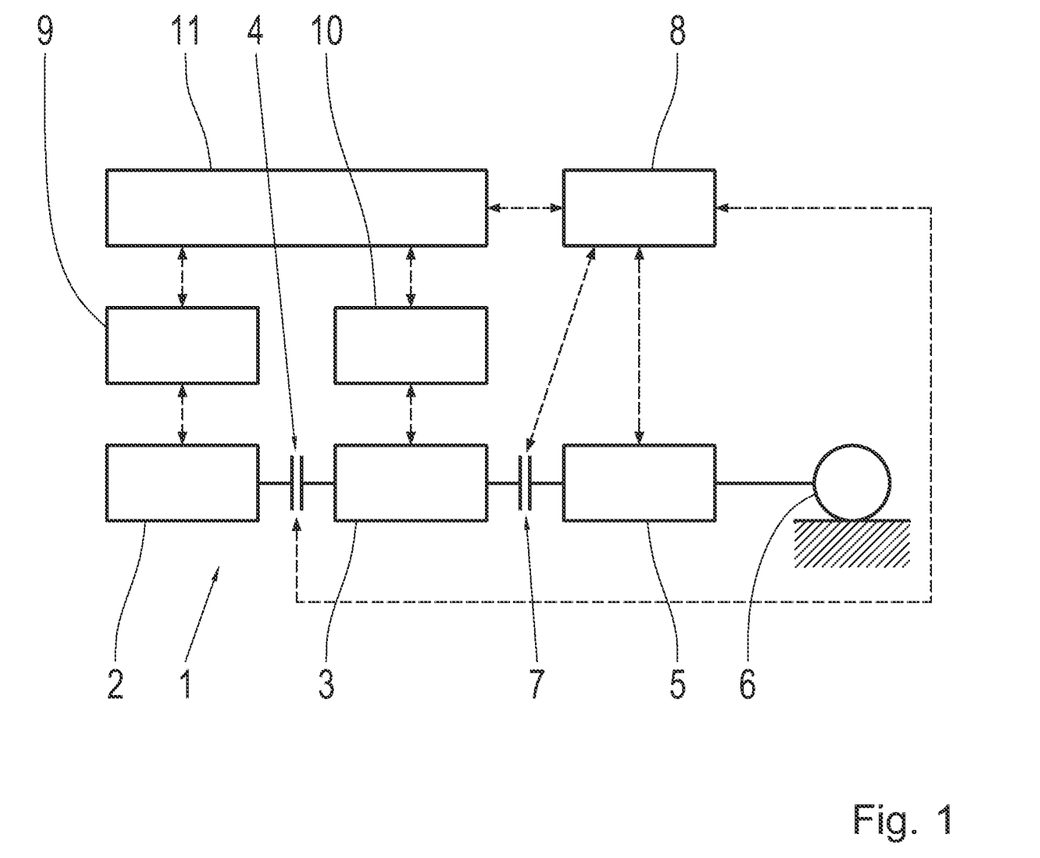
FIG. 1 shows a diagram of a drive train of a hybrid vehicle.

FIG. 1 shows an exemplary diagram of a drive train 1 of a hybrid vehicle. A hybrid vehicle includes multiple prime movers, namely an electric machine 3 as the first prime mover and an internal combustion engine 2 as the second prime mover. A separating clutch 4 is connected between the electric machine 3 and the internal combustion engine 2. A transmission 5 is connected between the electric machine 3 and a driven end 6 of the hybrid vehicle.

The transmission 5 can include a launch clutch 7, which is also connected between the electric machine 3 and the driven end 6. In the exemplary embodiment shown, the launch clutch 7 is a transmission-internal shift element of the transmission 5. It is also possible that a transmission-external launch clutch 7 is present.

For the case in which the separating clutch 4 is disengaged, the internal combustion engine 2 is decoupled from the electric machine 3, from the transmission 5, and from the driven end 6. In this case, provided that a force-locking gear is engaged in the transmission 5, drive torque can be provided at the driven end 6 exclusively starting from the electric machine 3. With the separating clutch 4 disengaged, the internal combustion engine 2 can run or be shut off.

For the case in which the drive train 1 from FIG. 1 is operated with the separating clutch 4 disengaged and the internal combustion engine 2 shut off, the condition of a purely electric operation is present. For the case in which the internal combustion engine 2 runs with the separating clutch 4 disengaged, for example, a generator (not shown) can be driven and/or an electrical energy store (not shown) can be charged. However, driving also takes place under purely electric motor power and drive torque is provided at the driven end 6 under purely electric motor power. For the case in which the separating clutch 4 is engaged, the internal combustion engine 2 is coupled to the driven end 6. For the case in which a force-locking gear is engaged in the transmission 5, drive torque can be provided at the driven end 6 starting from the electric machine 3 and starting from the internal combustion engine 2.

Although the arrangement, shown in FIG. 1, of an internal combustion engine 2, an electric machine 3, and a transmission 5 of the hybrid vehicle is preferred, another arrangement can also be utilized, of course.

FIG. 1 also shows control-side assemblies, such as a transmission control unit 8, which controls the operation of the transmission 5 by way of an open-loop and/or closed-loop system. For this purpose, the transmission control unit 8 exchanges data with the transmission 5 as indicated by the double arrow shown. The separating clutch 4 connected between the internal combustion engine 2 and the electric machine 3 can also be actuated via the transmission control unit 8.

The operation of the internal combustion engine 2 is controlled by an internal combustion engine control unit 9 by way of an open-loop and/or closed-loop system. The operation of the electric machine 3 is controlled by an electric machine control unit 10 by way of an open-loop and/or closed-loop system. For this purpose, the internal combustion engine control unit 9 exchanges data with the internal combustion engine 2 and the electric machine control unit 10 exchanges data with the electric machine 3, in both cases as indicated by the dashed-line arrows.

Likewise the internal combustion engine control unit 9 and the electric machine control unit 10 exchange data with a hybrid control unit 11. In addition, the hybrid control unit 11 exchanges data with the transmission control unit 8. According to FIG. 1, the transmission control unit 8 can also communicate directly with the electric machine control unit 10. Although not shown in FIG. 1, a direct data exchange can also take place between the internal combustion engine control unit 9 and the electric machine control unit 10.

The hybrid control unit 11 can be an integral part, on the hardware side, of the internal combustion engine control unit 9. It is possible, however, that the hybrid control unit 11 is an integral part, on the hardware side, of the transmission control unit 8. The hybrid control unit 11 controls, by way of an open-loop and/or closed-loop system, in particular, a torque output from the internal combustion engine 2 and the electric machine 3. The transmission control unit 8 controls, by way of an open-loop and/or closed-loop system, the operation of the transmission 5 and of the separating clutch 4.

Although this system architecture of the control units 8, 9, 10, and 11 is preferred, another control-side system architecture can also be implemented.

Example aspects of the invention provide that, for the case in which, during driving under purely electric motor power, the separating clutch 4 is to be engaged, on the one hand, to couple the internal combustion engine 2 and, thereby, change from an electric operation of the hybrid vehicle to a hybrid operation thereof, i.e., for the case in which a demand to engage the separating clutch 4 is present and, on the other hand, for the case in which an upshift is to be implemented in the transmission 5, i.e., for the case in which a demand to implement an upshift is present, is to coordinate the engagement of the separating clutch 4 and the implementation of the upshift in the transmission 5 with each other and, in fact, with the objective of preventing a vehicle-side rotational speed from reaching or exceeding a rotational speed limit value, i.e., preventing a critical overspeed from being present. The vehicle-side rotational speed that is not to reach or exceed a rotational speed limit value is, in particular, a prime mover-side rotational speed. If a prime mover-side rotational speed exceeds an appropriate rotational speed limit value, the prime mover-side rotational speed must be governed in order to avoid a critical overspeed.

With example aspects of the invention, it is provided that, in the presence of a control-side demand to engage the separating clutch 4 and, thereby, couple the internal combustion engine 2 and, in the presence of a control-side demand to implement an upshift, it is checked whether the demanded upshift is absolutely necessary in order to prevent a vehicle-side rotational speed from reaching or exceeding a rotational speed limit value. This can take place in that a calculated or estimated maximum rotational speed of the prime movers, which forms before or during the implementation of the upshift, is compared to the rotational speed limit value of the prime movers.

If an overspeed-critical upshift is demanded, which is necessary in order to prevent the vehicle-side rotational speed from reaching or exceeding the rotational speed limit value, the implementation of the gear shift in the transmission 5 is prioritized over the engagement process of the separating clutch 4 and, thereby, over the coupling of the internal combustion engine 2.

Characteristics of example aspects of the invention are described in the following with reference to FIGS. 2 through 4.

Figure 2:
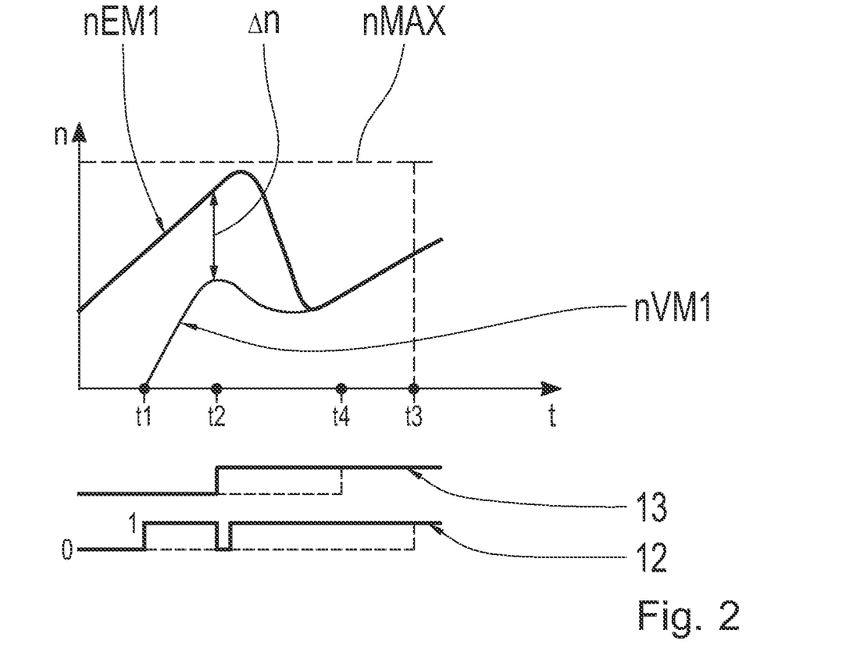
FIG. 2 shows a time-dependency diagram with rotational speed profiles.

In FIG. 2, profiles of rotational speeds n are shown with respect to the time t, namely a profile of a rotational speed nEM1 of the electric machine 3 and a profile of the rotational speed nVM1 of the internal combustion engine 2. Moreover, a rotational speed limit value nMAX is shown, which the rotational speeds nEM1 and nVM1 of the electric machine 3 and the internal combustion engine 2 are not permitted to reach or exceed.

In FIG. 2, an electric operation with the separating clutch 4 disengaged is present before the point in time t1. At the point in time t1 from FIG. 2, a demand is present to engage the separating clutch 4 and, thereby, couple the internal combustion engine 2, wherein, in FIG. 2, immediately at the point in time t1, the engagement of the separating clutch 4 is triggered and the implementation of the engagement process of the separating clutch 4 is begun. FIG. 2 shows that, at the point in time t1, a control-side signal profile 12 for the engagement of the separating clutch 4 switches from the status 0, which corresponds to a control-side disengagement of the separating clutch 4, to the status 1, which corresponds to a control-side engagement of the separating clutch 4.

The solid-line profile of the signal profile 12 shows the desired condition of the separating clutch 4. The dashed-line profile of the signal profile 12 shows the current condition of the separating clutch 4. The engagement process of the separating clutch 4 is implemented while the current condition deviates from the desired condition. At the point in time t3, the engagement of the separating clutch 4 is concluded.

Due to the engagement process of the separating clutch 4, starting at the point in time t1, the rotational speed nVM1 of the internal combustion engine 2 is guided in the direction of the rotational speed nEM1 of the electric machine 3, which corresponds to the synchronous speed of the current gear engaged in the transmission 5.

In FIG. 2, the demand for an upshift that is absolutely necessary in order to prevent a vehicle-side rotational speed from reaching or exceeding a rotational speed limit value is present at the point in time t2.

In FIG. 2, a control-side signal profile 13 visualizes the change of a demanded target gear in the transmission 5 at the point in time t2 and, thereby, the demand for an upshift to be implemented in the transmission 5 from a presently engaged current gear into the desired target gear or specified gear of the upshift.

The solid-line profile of the signal profile 13 visualizes the specified gear or target gear in the transmission. The dashed-line profile of the signal profile 13 visualizes the current gear. The gear shift is implemented in the transmission 5 while the current gear deviates from the target gear. At the point in time t4, the gear shift in the transmission 5 is concluded.

In FIG. 2, for the case in which the implementation of an upshift that is absolutely necessary in order to avoid an overspeed is demanded on the control side during an on-going engagement process of the separating clutch 4, it is checked whether a difference Δn between the synchronous speed of the current gear, which corresponds to the rotational speed nEM1 of the electric machine 3, and the current rotational speed nVM1 of the internal combustion engine 2 is greater than or less than a limit value.

In FIG. 2, it is established that this speed differential Δn is greater than the limit value, wherein, in FIG. 2, the engagement process of the separating clutch 4 is then aborted. Subsequently, the upshift in the transmission 5 is immediately triggered and implemented and, once the upshift has been implemented in the transmission 5, the engagement process for the separating clutch 4 is implemented, namely triggered once again and implemented.

The signal profile 12 from FIG. 2 visualizes that the engagement of the separating clutch 4 is aborted at the point in time t2. As a result thereof, the rotational speed nVM1 of the internal combustion engine decreases again.

The engagement process for the separating clutch 4 demanded once again after the point in time t2 is implemented into the target gear of the upshift to be implemented, for the purpose of which, according to FIG. 2, the rotational speed nVM1 of the internal combustion engine 2 is synchronized to the synchronous speed of the target gear of the upshift to be implemented. Therefore, while a synchronization of the rotational speed nVM1 of the internal combustion engine 2 with the synchronous speed of the current gear takes place between the points in time t1 and t2 in order to engage the separating clutch 4, after the point in time t2 a synchronization of the rotational speed nVM1 of the internal combustion engine 2 with the synchronous speed of the target gear of the upshift to be implemented takes place. At the point in time t3, the engagement of the separating clutch 4, which has been demanded once again, into the target gear of the upshift to be implemented is concluded.

Figure 3:
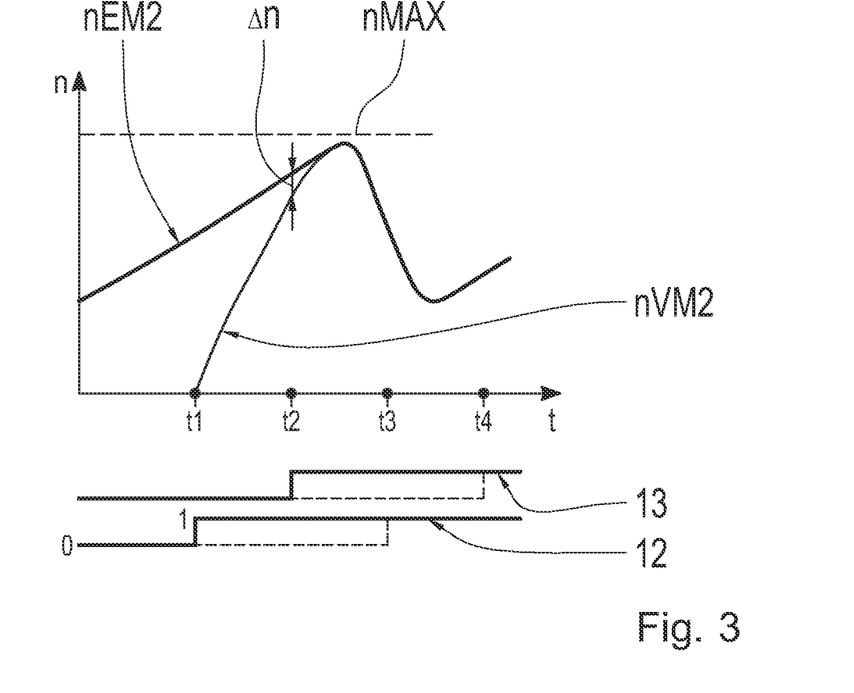
FIG. 3 shows a time-dependency diagram with further rotational speed profiles.

In FIG. 3 as well, the rotational speeds nVM2 of the internal combustion engine 2 and nEM2 of the electric machine 3 are shown with respect to the time t, wherein an electric operation with the separating clutch 4 disengaged is present before the point in time t1.

In FIG. 3, as is also the case in FIG. 2, at the point in time t1, a control-side demand is present to engage the separating clutch 4 and, thereby, couple the internal combustion engine 2 and, at the point in time t1, the implementation of the engagement process of the separating clutch 4 is begun and the rotational speed nVM2 of the internal combustion engine 2 is guided toward the rotational speed nEM2 of the electric machine 3 and, thereby, to the synchronous speed of the current gear engaged in the transmission 5.

At the point in time t2, in FIG. 3, a demand is present to implement an upshift that is absolutely necessary in order to avoid an overspeed, wherein, in FIG. 3, it is established at the point in time t2 that the difference Δn between the synchronous speed of the current gear of the upshift to be implemented, which corresponds to the rotational speed nEM2 of the electric machine 3, and the current rotational speed of the internal combustion engine 2 is less than the limit value.

In FIG. 3, the engagement process of the separating clutch 4 is continued and, in parallel thereto or simultaneously therewith, starting at the point in time t2, the upshift in the transmission 5 is triggered and implemented, namely the upshift that is necessary in order to prevent a vehicle-side rotational speed from reaching or exceeding a rotational speed limit value. At the point in time t3, the engagement of the separating clutch 4 is concluded. At the point in time t4, the implementation of the upshift is concluded. For the engagement of the separating clutch 4, in FIG. 3, parameters of the engagement process of the separating clutch 4, in particular of a pressure control of the separating clutch 4, are preferably adapted in order to accelerate the engagement process of the separating clutch 4.

In FIG. 3, the engagement process of the separating clutch 4 must therefore not be terminated. Rather, the engagement process of the separating clutch 4 is accelerated in order to immediately implement the demanded upshift. Due to the fast engagement of the separating clutch 4, losses of comfort can occur during the engagement of the separating clutch 4, which must be accepted, however, in order to avoid a critical overspeed and directly implement the demanded upshift.

In the example variants of FIGS. 2 and 3, therefore, for the case in which a demanded engagement process of the separating clutch 4 is already in progress or is implemented and, for the case in which an upshift is demanded that is absolutely necessary in order to avoid a critical overspeed in the hybrid vehicle, it is checked whether the difference between the synchronous speed of the current gear of the demanded upshift and the current rotational speed of the internal combustion engine 2 is greater than or less than a limit value, wherein, depending thereon, the engagement process of the separating clutch 4 and the implementation of the gear shift in the transmission 5 are influenced.

If this speed differential is greater than the limit value, the engagement process of the separating clutch 4 is aborted and the gear shift in the transmission 5 is immediately triggered and implemented. For the case as well in which this speed differential is less than the limit value, the gear shift in the transmission 5 is immediately triggered and implemented. The engagement process of the separating clutch 4 is continued, however, preferably with adapted parameters for the engagement process.

Figure 4:
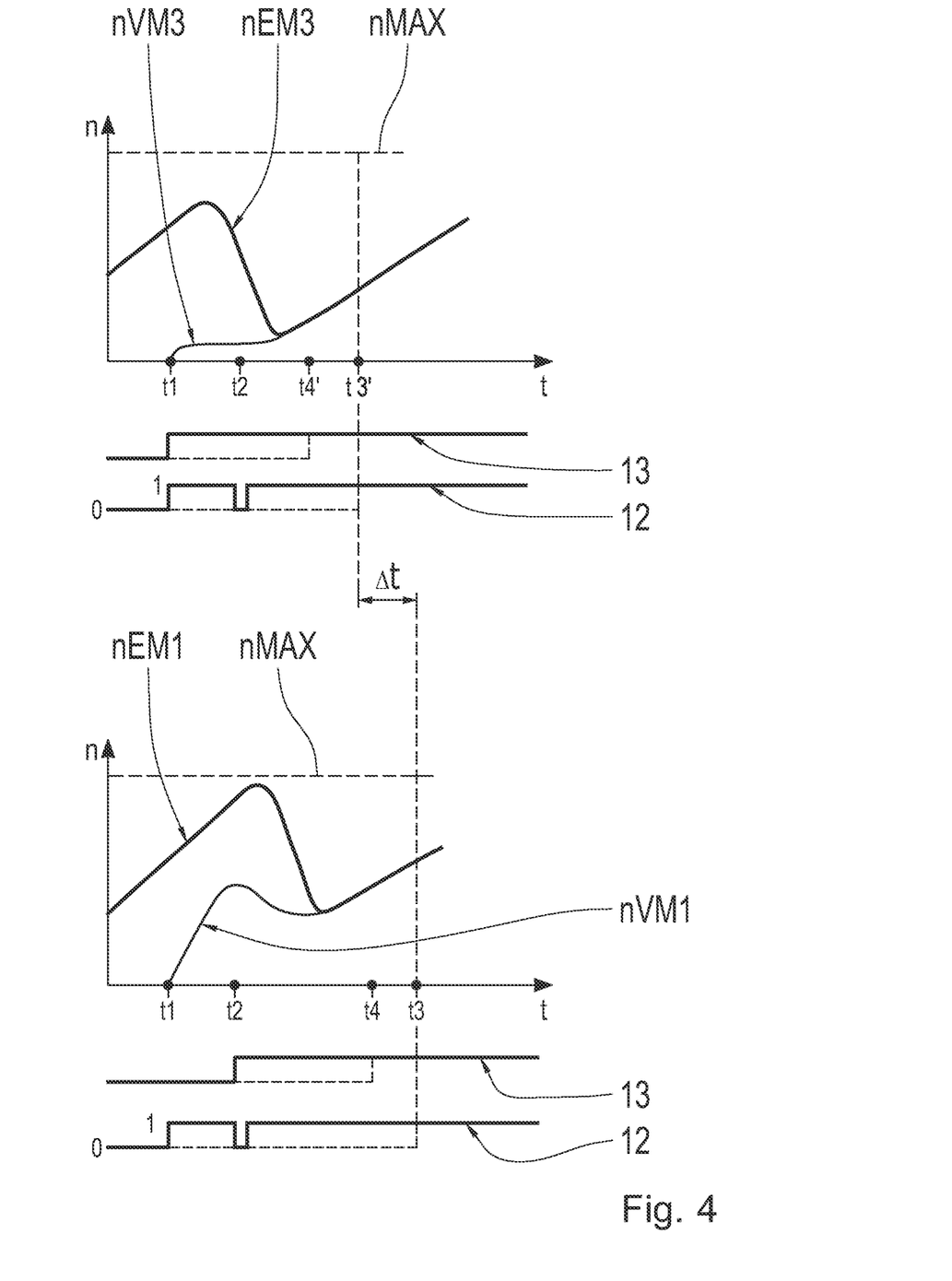
FIG. 4 shows time-dependency diagrams with further rotational speed profiles.

FIG. 4 visualizes one further embodiment of the method according to example aspects of the invention. In FIG. 4, the rotational speed profiles nEM1 and nVM1 from FIG. 2 are shown in the lower time-dependency diagram as a reference. In the upper time-dependency diagram from FIG. 4, the rotational speed nVM3 is shown for the internal combustion engine 2 and the rotational speed nEM3 is shown for the electric machine 3.

The upper time-dependency diagram from FIG. 4 differs from the lower time-dependency diagram from FIG. 4 in that, for the case in which a demand to engage the separating clutch 4 is present at the point in time t1 due to a demand to couple the internal combustion engine 2, a trigger point is ascertained at the point in time t1, at which a demanded upshift that is absolutely necessary in order to avoid an overspeed must be triggered at the latest in order to prevent the particular vehicle-side rotational speed from reaching or exceeding the rotational speed limit value.

As the first period of time, a period of time between the demand for the engagement process of the separating clutch 4 and the ascertained trigger point of the upshift is ascertained. It is checked whether this first period of time between the demand for the engagement process of the separating clutch 4 and the ascertained trigger point of the upshift is shorter than a second period of time that is required in order to engage the separating clutch 4 to such an extent that the demanded upshift can be triggered. Depending thereon, the engagement process of the separating clutch 4 and the implementation of the upshift in the transmission 5 are implemented and, in fact, in such a way that, for the case in which the first period of time is shorter than the second period of time, the upshift is immediately triggered at the point in time t1 and the engagement process of the separating clutch 4 is implemented into the target gear of the upshift.

The upper time-dependency diagram from FIG. 4, namely the signal profile 13, shows that the triggering of the upshift that is absolutely necessary in order to avoid an overspeed is preferred, that the triggering and implementation of the upshift is therefore begun immediately, and that the rotational speed nVM3 of the internal combustion engine 2 is synchronized with the synchronous speed of the target gear of the upshift to be implemented, and so, after the implementation of the upshift, the separating clutch 4 can be engaged.

In the upper part of FIG. 4, the engagement of the separating clutch 4 is concluded at the point in time t3' after the implementation of the preferred upshift. The implementation of the upshift is already concluded at the point in time t4'.

With the embodiment of the method according to example aspects of the invention as shown in the upper time-dependency diagram from FIG. 4, in comparison to the lower time-dependency diagram from FIG. 4, the gain of time Δt for the engagement of the separating clutch 4 and the implementation of the upshift can therefore be achieved.

According to the embodiment of example aspects of the invention as shown in the upper time-dependency diagram from FIG. 4, therefore, in the presence of a demand for an engagement process of the separating clutch 4, the trigger point for the upshift that is absolutely necessary in order to avoid an overspeed is ascertained, at which the upshift must be triggered at the latest in order to prevent the particular vehicle-side rotational speed from reaching or exceeding the rotational speed limit value. For the case in which the period of time between the demand for the engagement process of the separating clutch 4 and the ascertained trigger point of the upshift is shorter than the period of time that is required in order to engage the separating clutch, the upshift is preferred and immediately triggered and implemented. The engagement of the separating clutch 4 then takes place only after the implementation of the upshift in the transmission 5, for the purpose of which, according to the upper time-dependency diagram from FIG. 4, the rotational speed nVM3 of the internal combustion engine 2 is immediately synchronized with the target rotational speed of the upshift to be implemented and not, as shown in the lower time-dependency diagram from FIG. 4, initially with the synchronous rotational speed of the current gear of the upshift to be implemented.

For the case in which the first period of time between the demand for the engagement process of the separating clutch 4 and the ascertained trigger point of the upshift that is absolutely necessary in order to avoid an overspeed is longer than the second period of time that is required in order to engage the separating clutch, the separating clutch 4 can be engaged at first and then the upshift can be implemented.

The trigger point for an upshift can be calculated depending on the limit value nMAX of the rotational speed, depending on the speed gradient of the current rotational speed of the electric machine 3, and depending on a period of time that is required for implementing the upshift. The period of time required for implementing an upshift is known on the control side, as is also the case for the rotational speed limit value nMAX and the gradient of the rotational speed of the electric machine and, thereby, the gradient of the synchronous speed of the actual gear of the upshift.

Example aspects of the invention also relate to a control unit for operating a hybrid vehicle, which is configured for implementing the above-described method on the control side. This control unit is, in particular, the transmission control unit 8.

In the presence of a control-side demand to engage the separating clutch 4 and, thereby, couple the internal combustion engine 2 and, in the presence of a control-side demand to implement an upshift in the transmission 5, the control unit checks whether the demanded upshift is necessary in order to prevent a vehicle-side, in particular prime mover-side, rotational speed from reaching or exceeding a rotational speed limit value. Provided this is the case, i.e., for the case in which the demanded upshift is absolutely necessary in order to prevent the vehicle-side rotational speed from reaching or exceeding the rotational speed limit value, the control unit prioritizes the implementation of the upshift in the transmission 5 over the engagement process of the separating clutch 4 and, in fact, as described above in detail with reference to FIGS. 2 through 4.

The control unit according to example aspects of the invention is an electronic control unit, which includes hardware and software.

The hardware includes data interfaces for exchanging data with the assemblies contributing to the implementation of the method according to example aspects of the invention, such as with the hybrid control unit 11, which provides rotational speeds of the internal combustion engine 2 and the electric machine 3, and with the separating clutch 4 and the transmission 5. The hardware also includes a processor for data processing and a memory for data storage. The software includes program modules, which are implemented in the control unit in order to implement the method according to example aspects of the invention on the control side.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 drive train
2 internal combustion engine
3 electric machine
4 separating clutch
5 transmission
6 drive output
7 launch clutch
8 transmission control unit
9 internal combustion engine control unit
10 electric machine control unit
11 hybrid control unit
12 signal profile
13 signal profile

The invention claimed is:

1. A method for operating a hybrid vehicle that includes an electric machine (3) as a first prime mover, an internal combustion engine (2) as a second prime mover, a separating clutch (4) connected between the internal combustion engine (2) and the electric machine (3), and a transmission (5) connected between the electric machine (3) and a driven end (6), the method comprising:

in response to a control-side demand to engage the separating clutch (4), implementing an engagement process of the separating clutch (4) during driving under purely electric motor power;

in response to a control-side demand to implement an upshift in the transmission (5), implementing a gear ratio change from a current gear of the upshift into a target gear of the upshift;

in response to the control-side demand to engage the separating clutch (4) and the control-side demand to implement the upshift, checking whether the demanded upshift is necessary in order to prevent a vehicle-side rotational speed from reaching or exceeding a rotational speed limit value;

when the demanded upshift is necessary in order to prevent the vehicle-side rotational speed from reaching or exceeding the rotational speed limit value, prioritizing implementing the upshift in the transmission (5) over implementing the engagement process of the separating clutch (4); and when the demanded engagement process of the separating clutch (4) has already been initiated and the control-side demand for the upshift is present, checking whether a difference between a synchronous speed of the current gear of the demanded upshift and a current rotational speed of the internal combustion engine (2) is greater than or less than a limit value.

2. The method of claim 1, further comprising, depending on whether the difference between the synchronous speed of the current gear of the demanded upshift and the current rotational speed of the internal combustion engine (2) is greater than or less than the limit value, adjusting the implementation of the engagement process of the separating clutch (4) and the implementation of the upshift in the transmission (5).

3. The method of claim 1, further comprising, when the difference between the synchronous speed of the current gear and the current rotational speed of the internal combustion engine is greater than the limit value:

aborting the engagement process of the separating clutch (4) as well as triggering and implementing the upshift in the transmission (5); and after the upshift in the transmission (5), triggering and implementing the engagement process of the separating clutch (4).

4. The method of claim 1, further comprising, when the difference between the synchronous speed of the current gear and the current rotational speed of the internal combustion engine (2) is less than the limit value:

continuing the engagement process of the separating clutch (4); and in parallel to the engagement process of the separating clutch (4), triggering and implementing the upshift in the transmission (5).

5. The method of claim 4, wherein continuing the engagement process of the separating clutch (4) comprises adapting parameters of the engagement process of the separating clutch (4) in order to accelerate the engagement process of the separating clutch (4).

6. The method of claim 5, wherein the parameters of the engagement process comprise a pressure control of the separating clutch (4).

7. The method of claim 1, further comprising:

when the engagement process of the separating clutch (4) is demanded, ascertaining a trigger point at which a demanded upshift must be triggered at the latest in order to prevent the vehicle-side rotational speed from reaching or exceeding the rotational speed limit value;

ascertaining, as a first period of time between the demand for the engagement process of the separating clutch (4) and the ascertained trigger point of the upshift;

checking whether the first period of time is shorter than a second period of time required in order to engage the separating clutch (4) to such an extent that the upshift is triggerable; and depending on whether the first period of time is shorter than the second period of time, adjusting the implementation of the engagement process of the separating clutch (4) and the implementation of the upshift in the transmission (5).

8. The method of claim 7, wherein, when the first period of time is shorter than the second period of time, immediately triggering and implementing the upshift as well as implementing the engagement process of the separating clutch (4) into the target gear of the upshift.

9. A control unit configured for implementing the method of claim 1.

10. A control unit for operating a hybrid vehicle that includes an electric machine (3) as a first prime mover, an internal combustion engine (2) as a second prime mover, a separating clutch (4) connected between the internal combustion engine (2) and the electric machine (3), and a transmission (5) connected between the electric machine (3) and a driven end (6), the control unit configured for:

in response to a control-side demand to engage the separating clutch (4), implementing an engagement process of the separating clutch (4) during driving under purely electric motor power;

in response to the control-side demand to engage the separating clutch (4) and a control-side demand to implement an upshift, checking whether the demanded upshift is necessary in order to prevent a vehicle-side rotational speed from reaching or exceeding a rotational speed limit value;

when the demanded upshift is necessary in order to prevent the vehicle-side rotational speed from reaching or exceeding the rotational speed limit value, prioritizing implementing the upshift in the transmission (5) over engaging the separating clutch (4); and when the demanded engagement process of the separating clutch (4) has already been initiated and the control-side demand for the upshift is present, checking whether a difference between a synchronous speed of the current gear of the demanded upshift and a current rotational speed of the internal combustion engine (2) is greater than or less than a limit value.

* * * * *